(12) United States Patent
Fludger (10) Patent No.: US 8,655,196 B2
(45) Date of Patent: Feb. 18, 2014

(54) PHASE CONTROL CIRCUIT AND METHOD FOR OPTICAL RECEIVERS

(75) Inventor: Christopher Fludger, Nuremberg (DE)

(73) Assignee: Cisco Technology, Inc., San Jose, CA (US)

( * ) Notice: Subject to any disclaimer, the term of this patent is extended or adjusted under 35 U.S.C. 154(b) by 370 days.

(21) Appl. No.: 12/920,705

(22) PCT Filed: Mar. 3, 2009

(86) PCT No.: PCT/EP2009/052515
§ 371 (c)(1),
(2), (4) Date: Sep. 2, 2010

(87) PCT Pub. No.: WO2009/109582
PCT Pub. Date: Sep. 11, 2009

(65) Prior Publication Data
US 2011/0006825 A1      Jan. 13, 2011

(30) Foreign Application Priority Data
Mar. 6, 2008   (EP) ..................... 08102343

(51) Int. Cl.
*H04B 10/06*   (2011.01)
*H04B 10/04*   (2011.01)
(52) U.S. Cl.
USPC ........... 398/213; 398/202; 398/203; 398/212
(58) Field of Classification Search
USPC ................................ 398/202–214
See application file for complete search history.

(56) References Cited

U.S. PATENT DOCUMENTS

| | | | |
|---|---|---|---|
| 4,850,048 A * | 7/1989 | Mohr ............................ | 398/205 |
| 6,097,768 A | 8/2000 | Janesch et al. | |
| 7,389,055 B1 * | 6/2008 | Rickard et al. ............... | 398/206 |
| 2005/0002675 A1 * | 1/2005 | Sardesai et al. ............... | 398/183 |
| 2005/0088659 A1 * | 4/2005 | Schlenk et al. ............... | 356/477 |
| 2006/0133827 A1 * | 6/2006 | Becouarn et al. ............. | 398/213 |
| 2007/0047954 A1 | 3/2007 | Mamyshev | |
| 2007/0047964 A1 * | 3/2007 | Ooi et al. ...................... | 398/147 |

(Continued)

FOREIGN PATENT DOCUMENTS

| | | |
|---|---|---|
| EP | 1098459 A2 | 5/2001 |
| JP | 2007-43638 | 2/2007 |
| JP | 2007-060583 | 3/2007 |
| JP | 2007-318483 | 12/2007 |

OTHER PUBLICATIONS

International Search Report in counterpart International Application No. PCT/EP2009/052515, mailed Apr. 9, 2009.

(Continued)

*Primary Examiner* — Daniel Dobson
(74) *Attorney, Agent, or Firm* — Edell, Shapiro & Finnan, LLC (57) ABSTRACT

This invention relates to a phase control circuit for an optical receiver (1). The phase control circuit (9, 19) comprises a non-linear element (22) and a power detector (24). The non-linear element (22) has a rectifying characteristic, inputs the received electrical signal (7, 17) and provides a rectified signal at its output. The power detector (24) provides an error signal which is used to obtain a phase control signal (5) which is output by the phase control circuit. The invention further relates to a corresponding method for phase control of an optical receiver (1).

12 Claims, 4 Drawing Sheets

(56) References Cited

U.S. PATENT DOCUMENTS

| | | | | |
|---|---|---|---|---|
| 2007/0058988 A1* | 3/2007 | Yonenaga | ................ | 398/186 |
| 2007/0127933 A1* | 6/2007 | Hoshida et al. | ................ | 398/202 |
| 2008/0031633 A1* | 2/2008 | Hoshida et al. | ................ | 398/149 |
| 2008/0175602 A1* | 7/2008 | Mitani et al. | ................ | 398/202 |

OTHER PUBLICATIONS

Frank Herzog et al., Optical Phase Locking by Local Oscillator Phase Dithering, IEEE Journal of Quantum Electronics, vol. 42., No. 10, Oct. 1, 2006, pp. 973-985, Piscataway, New Jersey.

Klaus H. Kudielka et al., Optical Homodyne PSK Receiver: Phase Synchronization by Maximizing Baseband Signal Power, IEEE Lasers and Electro-Optics Society, 1999 12th Annual Meeting, vol. 1, Nov. 8, 1999, pp. 295-296, Piscataway, New Jersey.

M. Uchishima et al., Burst DSP Demodulator for Low EB/N0 Operation, Proceedings of the International Conference on Communications—Rising to the Heights, vol. 1 of 03, Jun. 23-26, 1991, New York, IEEE, US.

Office Action in counterpart Japanese Application No. 2010-549130, mailed Feb. 12, 2013.

Office Action in counterpart Japanese Application No. 2010-549130, mailed Sep. 4, 2013.

* cited by examiner

PHASE CONTROL CIRCUIT AND METHOD FOR OPTICAL RECEIVERS

The present invention pertains to a phase control circuit and method according to the preamble parts of claims 1 and 7, respectively.

The invention relates to the field of high speed optical data transmission by optical fibers. More specifically this invention relates to phase control in optical receivers for QPSK, DQPSK and more advanced optical modulation formats.

One of the problems faced in high-speed optical data transmission is inter symbol interference (ISI). A single-bit has a length of approximately 2 cm in a 10 Gb/s system using amplitude shift keying (ASK) also called on/off keying (OOK) in an optical fiber having a refractive index of 1.5. Due to impairments of the optical transmission path such as polarisation mode dispersion (PMD) and chromatic dispersion (CD) bits of neighboring time slots overlap. As a consequence the energy of a single bit has to be recovered not only from a single time slot, but from a small number, e.g. 3, of successive time slots. This is referred to as equalization.

The better the equalization works, the further optical links may be at a given transmission rate and modulation scheme without digitally refreshing the signal. Alternatively, a better equalization technology may enable a higher transmission rate when the other parameters are fixed. A premium equalization technology is a maximum likelihood sequence estimator (MLSE) which is described e. g. in WO 2005/011220 A1 (attorney's reference: CO4WO) in the context of optical data transmission.

Another approach is to encode more than one bit into a single symbol, which is referred to multi-level signaling (cf. Peter J. Winzer, René-Jean Essiambre: "Advanced Optical Modulation Formats", Proceedings of the IEEE, Vol. 94, No. 5, Mai 2006, p. 952-985). This means that the symbol rate is smaller than the bit rate. In other words: multi-level signaling offers the benefits of higher spectral efficiencies. This is sometimes, but not always at the cost of a reduced tolerance to noise. Due to the increased length of each symbol in a multi-level signaling system, the ISI is reduced at a given data transmission rate and physical properties of the transmission channel.

Differential quadrature phase shift keying (DQPSK) has recently received appreciable attention in optical communications research. It transmits four phase shifts $\{0, \pi/2, -\pi/2, \pi\}$ at a symbol rate of half the aggregate bit rate, i. e. each symbol encodes two bits. A more simple modulation form is differential phase shift keying (DPSK) which uses two phase shifts $\{0, \pi\}$ as symbols to encode a single bit. This means that the symbol rate is equivalent to the bit rate for DPSK.

Figure 3:
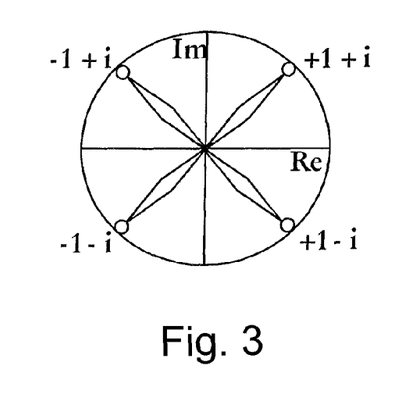
FIG. 3 illustrates QPSK symbols and RZ-DQPSK symbols.

For quadrature phase shift keying (QPSK) the symbols $\{1+i, -1+i, -1-i, 1-i\}$ may be used as shown in FIG. 3, wherein $i^2=-1$. A DQPSK symbol is the transition between two successive QPSK symbols. The transitions in FIG. 3 are illustrated for a return-to-zero (RZ) (D)QPSK signal. Therefore, all transitions go through the origin of the complex plane.

Figure 4:
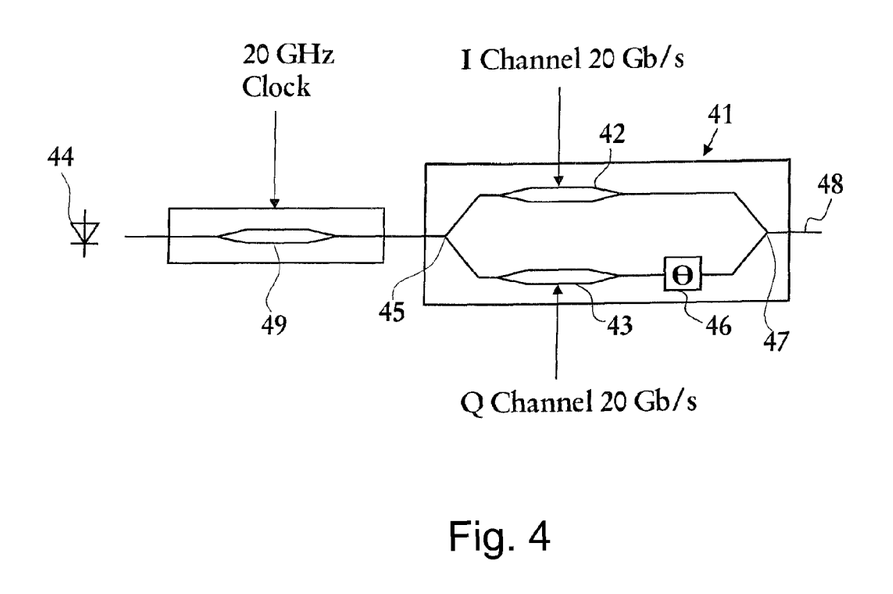
FIG. 4 illustrates a known transmitter for a RZ-DQPSK signal.

As shown in FIG. 4, a DQPSK transmitter 41 may be most conveniently implemented by two parallel Mach-Zehnder modulators 42, 43 (MZMs) operated as phase modulators. The DQPSK transmitter 41 further comprises a continuously operating laser source 44 and a splitter 45 to divide the light into two paths of equal intensity. The in-phase path is provided to the in-phase Mach-Zehnder modulator 42. The quadrature path is provided to the quadrature Mach-Zehnder modulator 43. The quadrature path comprises an optical $\pi/2$-phase shifter 46. A combiner 47 produces a single output signal 48 by combining the output of the in-phase and quadrature paths. In practice, these two Mach-Zehnders (42,43), phase shifter (46), splitter (45) and combiner (47) are a single device, termed a "parallel Mach-Zehnder", or "nested Mach-Zehnder structure".

Optionally a pulse carver 49 may be added in order to provide return-to-zero (RZ) pulse shaping, which gives improvements in terms of non-linearity and removes some of the imperfections created by the parallel Mach-Zehnder data modulator.

For a bit rate of 40 Gb/s, we obtain a symbol rate of 20 GHz. This requires a 20 GHz clock to drive the pulse carver 49. The transmitter structure of FIG. 4 requires only binary electronic drive signals at 20 Gb/s in our example for both, the in-phase channel and the quadrature channel. Such signals are much easier to generate at high speeds than multilevel drive waveforms.

Since any form of a shift keying like DQPSK or DPSK cannot directly be received using square-law detection (e. g. by a photodiode), one delay interferometer (DI) in the case of DPSK or two parallel DIs in the case of DQPSK are inserted in the optical path at the receiver side to convert the differential phase modulation in to intensity modulation.

Figure 5:
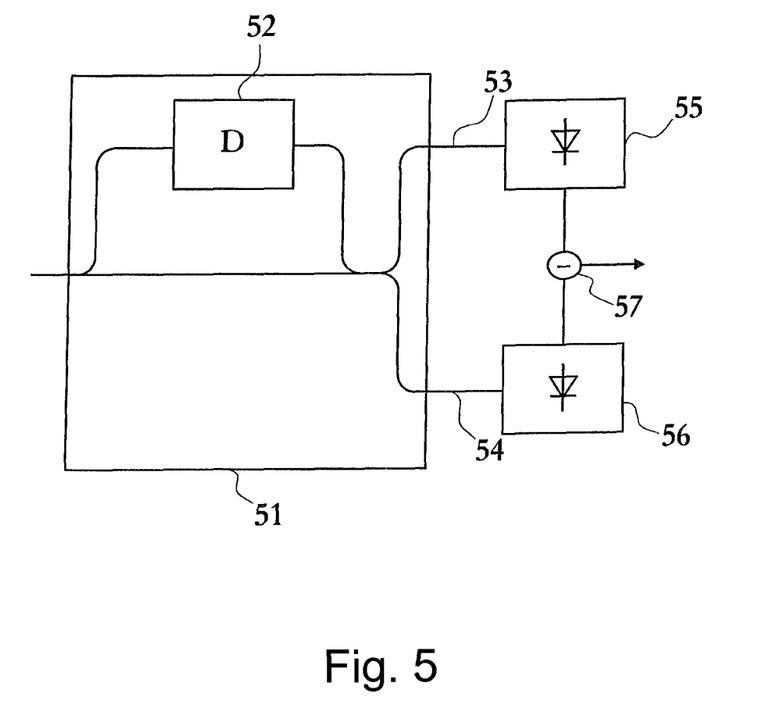
FIG. 5 illustrates a balanced receiver using a delay interferometer.

A single DI 51 is shown in FIG. 5. The DI splits the phase modulated signal into two paths, which experience a delay (D) difference 52 approximately equal to an integer multiple of the symbol duration T in order to let neighboring symbols interfere at the DI output. The delay difference must comply to the pre-coding of the phase difference in the transmitter, which is not necessarily done between adjacent symbols, but may be done between every $2^{nd}$, $3^{rd}$, etc. symbol. In practice it is better to encode adjacent pairs and use a delay difference equivalent to one symbol duration for improved tolerance to manufacturing tolerances of the receiver interferometer.

The differential delay is implemented by differential physical path lengths within the DI, and needs to be designed to within ±10% for a 0.5-dB penalty. In addition, the DI path length difference has to be fine-tuned with subwavelength accuracy, i. e. on the order of 10 nm, corresponding to less than 0.1 fs, in the 1550 nm wavelength range, in order to control the interference conditions in the DI output.

At the destructive output port 53 the two optical fields interfere destructively whenever there is no phase change, and constructively whenever there is phase change between subsequent bits or symbols, in accordance with the differential pre-coding rule. The constructive output port 54 provides the logically inverted data pattern. In principle, one of the two output ports is sufficient to fully detect a DPSK signal. However, the 3-dB sensitivity advantage of DPSK over on/off keying (OOK) can only be realized for balanced detection using the two output ports. As shown in FIG. 5, the subtractor 57 obtains an electrical decision variable by subtracting the output signals of detectors 55 and 56. The reason for the superior performance of balanced detection compared to single-ended detection is the non-Gaussian noise statistics, characteristic of beat-noise limited systems.

In the case of DQPSK, the received signal is first split into two equal parts. Each part is processed by a balanced receiver of the form depicted in FIG. 5. The DI delay, however, has to be equal to a multiple of the symbol duration. The disadvantage of this receiver structure is a six times lower tolerance to frequency drifts between transmit laser and DI compared to DPSK. This corresponds to a three times lower phase tolerance due to the two times lower symbol rate of a DQPSK system for equivalent bit rates. For example, at 40 Gb/s and for a 1-dB penalty, DPSK tolerates ±1.2 GHz of laser-to-DI frequency mismatch, whereas DQPSK only allows for ±200

MHz. At 10 Gb/s, the tolerances are even tighter by a factor of four. The end-of-life stability of wavelength-locked DFB lasers used in commercial optical transmitters amounts to ±2.5 GHz, which requires feedback-controlled DI tuning within the receiver.

For DPSK a root-mean square (RMS) power detection has been suggested (cf e. g. US 2005/0088659 A1) to provide a phase control signal in DPSK systems. However, for the DQPSK signal, a closed eye (0 degree phase) and 45 degree phase have the same RMS power, as illustrated by equations (1) and (2):

$$\frac{1}{4}\{(\sqrt{2})^2 + 0 + 0 + (-\sqrt{2})^2\} = 1 \quad (1)$$

$$\frac{1}{2}\{(1)^2 + (-1)^2\} = 1 \quad (2)$$

Consequently, this scheme will therefore not work for DQPSK signals.

Simulations (cf "Electronic Signal Processing for Differential Phase Modulated Systems", M. Cavallari, C. R. S. Fludger, P. J. Anslow, OFC 2004, Los Angeles 2004) seem to indicate that MLSE can be successfully applied to both DBPSK and DQPSK systems, both for symbol-rate sampling and for two-fold oversampling discussed in earlier CoreOptics' application WO 2005/011220 A1 (attorney's reference: CO4WO).

It is the object of this invention to provide a phase control circuit and a method for phase control which maintain good interference in optical receivers for DQPSK and more advanced modulation formats.

This object is achieved by the subject matter of the independent claims.

Preferred embodiments of the invention are the subject matters of the dependent claims.

Minimizing the error signal is one way to obtain a phase control signal from a DQPSK-modulated signal.

A dither signal and a control loop comprising a mixer and an adder are a reliable means for minimum search.

If the control loop further comprises an integrator, any deviations from the minimum will be eliminated on the long run. An additional low-pass filter may speed up the finding of the minimum.

Since the clock signal does not comprise phase information, the bandwidth of the power detector can be advantageously tailored to remove or at least dampen the clock signal. A reasonable choice is an upper frequency which is approximately half of the symbol frequency of an optical data transmission system for which said phase control circuit is designed.

Connecting the input of the power detector to the output of the non-linear element by a capacitor advantageously removes a DC component and consequently reduces the required dynamic range of the power detector. As a consequence, costs and power consumption are reduced.

In the following preferred embodiments of this invention are described referring to the accompanying drawings.

ABBREVIATIONS

| Abbreviations | | | |
|---|---|---|---|
| AC: | alternating current | BER: | bit error rate |
| ASK: | amplitude shift keying | CD: | chromatic dispersion |
| CDR: | clock and data recovery | MLSE: | maximum likelihood sequence estimator |
| D: | delay | | |
| DC: | direct current | MZM: | Mach-Zehnder modulator |
| DGD: | differential group delay | NRZ: | non-return-to-zero |
| DI: | delay interferometer | OOK: | on/off keying |
| DQPSK: | differential quadrature phase shift keying | OSNR: | optical signal-to-noise ratio |
| | | PMD: | polarization mode dispersion |
| DPSK: | differential phase shift keying | | |
| | | RF: | radio frequency |
| FEC: | forward error correction | RMS: | root-mean square |
| ISI: | inter symbol interference | RZ: | return-to-zero |

While the present invention is described with reference to the embodiments as illustrated in the following detailed description as well as in the drawings, it should be understood that the following detailed description as well as the drawings are not intended to limit the present invention to the particular illustrative embodiments disclosed, but rather the described illustrative embodiments merely exemplify the various aspects of the present invention, the scope of which is defined by the appended claims.

Figure 1:
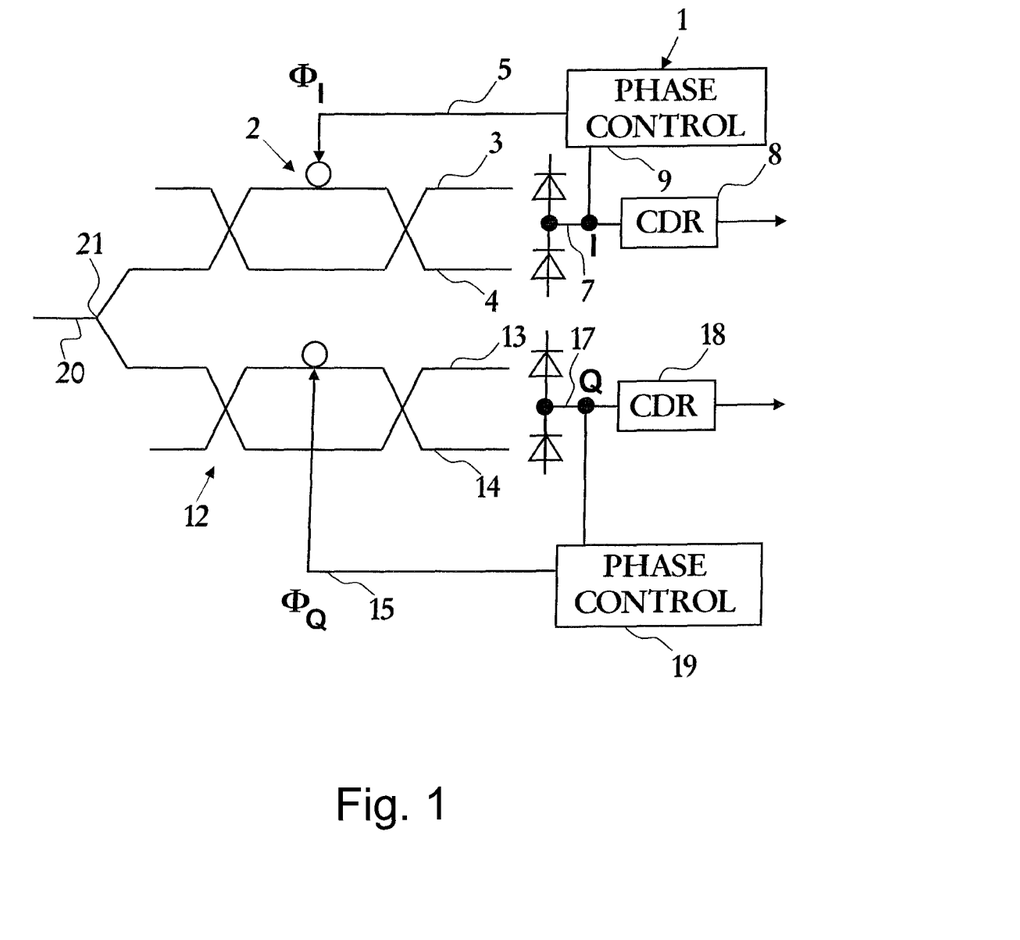
FIG. 1 illustrates a receiver comprising two parallel delay interferometers for DQPSK detection.

FIG. 1 shows a receiver 1 comprising two parallel delay interferometers for DQPSK detection. The received signal 20 is split at splitter 21 into two equal parts. One part is provided to an in-phase balanced receiver 2, the other part is provided to a quadrature balanced receiver 12. Two lines illustrate the outputs of the destructive output port 3 and the constructive output port 4 of the in-phase balanced receiver 2. An electrical received signal 7 is generated by a series connection of two photodiodes. The received electrical signal 7 is forwarded to a clock and data recovery (CDR) circuit 8 for recovering the in-phase data. The received electrical signal 7 is also forwarded to a phase control circuit 9 which generates a phase control signal 5 which is fed back to the DI of the in-phase balanced receiver 2 for fine-tuning the DI.

The quadrature balanced receiver 12 also comprises a destructive output port 13 and a constructive output port 14 illustrated by two lines. The quadrature balanced receiver 12 generates a received electrical signal 17 which is forwarded to a CDR circuit 18 and a phase control circuit 19 which generates a phase control signal 15 which is fed back to the DI of the quadrature balanced receiver 12 for fine-tuning the DI.

Each of the in-phase and quadrature balanced receivers 2 and 12 comprise a control loop for adjusting the phase. The difference between the in-phase balanced receiver 2 and the quadrature balanced receiver 12 is in the phase control circuits 9 and 19 and the respective DIs. Both phase control circuits generate a delay of approximately the symbol length. The delay difference of the DI of the in-phase balanced receiver 2 is fine-tuned that the constructive output of the DI becomes a maximum if there is no phase shift between two successive symbols. The delay difference, however, of the DI of the quadrature balanced receiver 12 is fine-tuned that the constructive output of the DI becomes a maximum if there is a phase shift of π/2 between two successive symbols. Apart from this minor difference the balanced receiver 2 and 12 are identical.

In a real implementation, test sequences may be incorporated into both, the in-phase signal and the quadrature signal for recognizing both signals on the receiver's side. The test sequences must be asymmetrical for discriminating the in-phase and quadrature signals from the inverted in-phase and quadrature signals, respectively.

Figure 2:
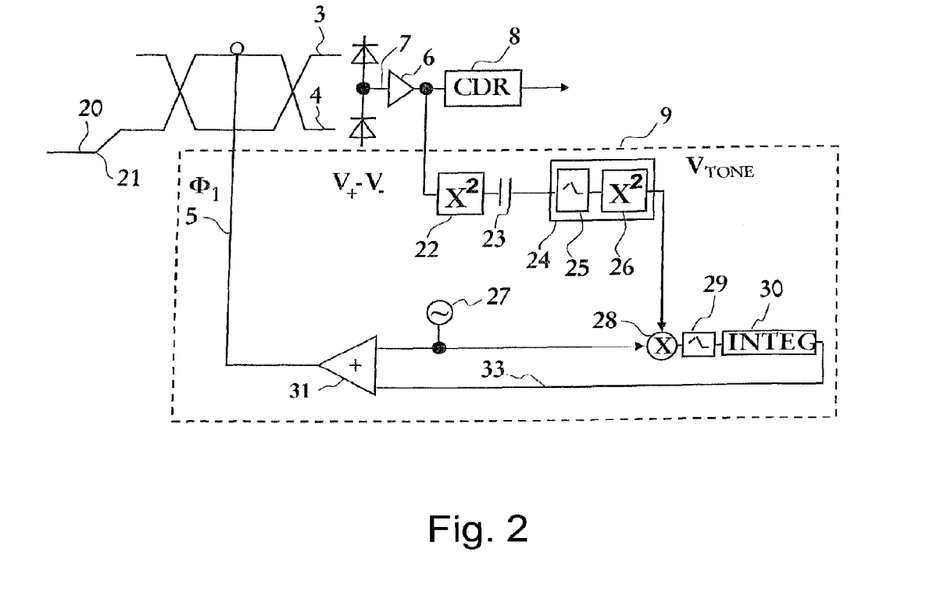
FIG. 2 shows a circuit diagram for the inventive phase control scheme.

FIG. 2 illustrates the phase control circuit 9 in greater detail, which comprises a squaring element 22, a capacitor 23, an RF power detector 24, a dither tone generator 27, a mixer 28, a low-pass filter 29, an integrator 30 and an adder 31. The phase control circuit 19 is identical. The electrical field E(t) of the received signal 20 may be described by the following equation:

$$E(t) = \sqrt{A(t)}\, e^{j\theta(t)} = \sqrt{A(t)}\, e^{j\frac{\pi}{4} + N_k \frac{\pi}{2}} \quad (3)$$

A(t) is the power envelope of the electrical field, which is essentially just a clock signal. θ(t) is the phase of the data. In DQPSK, the phase θ(t) changes by multiples of π/2 depending on the data $N_k$ where $N_k$ is an integer ∈{0,1,2,3}. t is the time and k designates a time slot of the length T. As described above, a DI is used to interfere successive symbols by introducing a delay difference of approximately T, which is the symbol duration. As indicated by the destructive output port 3, the constructive output port 4 and the series connection of two photodiodes, the result of balanced detection is the received electrical signal 7 $V_+ - V_-$:

$$V_+ - V_- = \mathcal{R}_e\left\{\sqrt{A(t)}\sqrt{A(t-T)}^* e^{j(\theta(t)-\theta(t-T))} e^{j\phi}\right\} \quad (4)$$
$$= A(t)\cos\left((N_k - N_{k-1})\frac{\pi}{2} + \phi\right)$$

The received electrical signal 7 is amplified by an amplifier 6, which is not shown in FIG. 1. The amplified received electrical signal 7 is squared by a squaring element 22. The output signal of the squaring element 22 may be described by the following equation, assuming that amplifier 6 provides an amplification of 1:

$$(V_+ - V_-)^2 = \frac{1}{2}(A^2(t)\cos(\pi\Delta N_k + 2\phi) + A^2(t)) \quad (5)$$

This provides two components: The first is a clock signal $A^2(t)$. For a 20 Gbaud system, there will be a strong tone at 20 GHz. The second component $A^2(t)\cos(\pi\Delta N_k+2\phi)$ is a signal that depends on the data $N_k$ and the phase of the interferometer φ. Importantly, when φ=π/4, this term vanishes, leaving only the clock signal. The second RF power detector 24, can then be used to measure the RF power. A dither tone, which will be described in the following, or other steepest descent method may be used to find this minimum. Simulations show that there is lowest RF power at the desired +/−45 degree points and that this control signal is still present even when there is a significant amount of optical noise of e.g. 12 dB optical signal-to-noise ratio (OSNR).

The output of squaring element 22 is AC-coupled to the input of the second RF power detector 24 by capacitor 23 in order to remove a 0-frequency component which does not comprise any information on the phase. The 0-frequency component results from the squaring element 22 and may also result from offset of electronic components. The 0-frequency component reduces the dynamic range required by the second RF power detector 24, consequently saves costs and power during operation.

The bandwidth of the second RF power detector 24 can be controlled to remove the clock signal $A^2(t)$, which is illustrated by low-pass filter 25, since the clock signal $A^2(t)$ does not comprise phase information. The upper frequency of the second power detector 24 is approximately half of the symbol frequency, which is a trade off between the frequency roll-off of the power detector and the clock tone at the symbol rate of the optical data transmission system, for which the phase control circuit is designed.

The high pass filtering of capacitor 23 and the low pass filtering of the second power detector 24 with its typical frequency roll-off and an upper frequency of half the symbol rate limit the signal range for the mixer 28 in a surprisingly simple and advantageous manner.

The main characteristic of the second RF power detector 24 is illustrated by squaring element 26. The interferometer phase is dithered by adding a dither signal provided by a dither tone generator 27 to the output of an integrator 30 by an adder 31. The output signal of adder 31 constitutes the phase control signal 5. The output of the second RF power detector 24 is synchronously mixed by a mixer 28 with the dither signal. The output of mixer 28 is then filtered in filter 29 and integrated in integrator 30.

Since the integrator 30 can act as a low pass filter, the low-pass filter 29 can be removed in another embodiment. However, the low-pass filter 29 reduces the signal range to the integrator. In one embodiment, the integrator is implemented by a DSP, where the control loop can be easily varied. The low-pass filter limits the signal dynamic range to that of an A/D converter before the DSP. To this end, this filter has a low-pass characteristic with the cut-off frequency at or just below the dither frequency to remove the double dither frequency components from the mixer. The necessary dynamic range of the A/D converter is therefore reduced.

Of course, a substantial amount of this control scheme may be carried out in an ASIC or DSP.

Although $\cos(\pi\Delta N_k+2\phi)$ becomes 0 for $$\phi = \frac{\pi}{2}\left(\frac{1}{2} + M\right)$$

provided that $\Delta N_k$ is an integer number, whereby M is also an integer number, either the points for odd or even M are stable. This depends on the sign of the control loop amplification, in particular on the sign of the DI characteristic in terms of $$\frac{d\phi}{dV},$$

wherein dφ is the phase change for the phase control voltage change dV and the sign of the integrator amplification which is usually negative.

Instead of squaring element 22, an envelope detector or an absolute value circuit may be used. Further, an XOR gate in the linear regime or discrete diode components may be used. A half wave rectifier would also work although its performance is not so good. It is actually only important that the replacement element, which replaces the squaring element 22 has some rectifying characteristic which may be provided by (an) even term(s) in the Taylor-series of the response curve of the replacement element. In that sense also an exponential response curve is suitable.

Similarly, the second RF power detector 24 may be replaced by a rectifier or another element mentioned before, which has some rectifying characteristic.

Simulation results seem to indicate that the control signal also gives near-optimum bit error ratio (BER) for RZ-DQPSK modulated data. This is true even when the received signal is distorted by chromatic dispersion or DGD (differential group delay $-1^{st}$ order PMD) in the transmission fiber. For the NRZ-DQPSK, signal distortion causes the control system to lock to a non-optimum phase. Consequently, a further optimisation process would be required, using forward error correction (FEC). Typically, FEC algorithms are able to correct input BER of $\sim 10^{-3}$ to better than $10^{-15}$ at the expense of some overhead (e.g. 7%). They can also provide information on the number of errors corrected, and hence the input BER. The FEC module corrects data from the CDR 8, 18 and provides an estimate of the input BER to the phase control modules 9, 19. The phase control modules 9, 19 then attempts to minimise the BER by small changes to the phase control signals 5, 15 and consequently to the interferometer phases. The small changes can be applied at the second input 33 of adder 31. In this embodiment, the second input 33 is disconnected from the output of the integrator 30. Otherwise the two control loops will interfere. Alternatively, the offsets can be added before the integrator.

Due to the recently increasing interest in coherent detection technology (et "CoreOptics delivers world's first 111 Gbps transmission record for over 2400 kilometers", Press Release Mar. 27, 2007, www.coreoptic.com), which was out of the focus of interest during the recent two decades due to optical amplification techniques, it should be noted that a phase control signal generated by the phase control circuit according to this invention may also be used to control the phase and fine-tune the frequency of a local laser in the receiver instead of tuning the delay difference of a DI as described above.

Further modifications and variations of the present invention will be apparent to those skilled in the art in view of this description. Accordingly, this description is to be construed as illustrative only and is for the purpose of teaching those skilled in the art the general manner of carrying out the present invention. It is to be understood that the forms of the invention shown and described herein are to be taken as the presently preferred embodiments.

Reference List 1 receiver
2 in-phase balanced receiver
3 destructive output port
4 constructive output port
5 phase control signal
6 amplifier
7 received electrical signal
8 clock and data recovery
9 phase control circuit
12 quadrature balanced receiver
13 destructive output port
14 constructive output port
15 phase control signal
17 received electrical signal
18 clock and data recovery
19 phase control circuit
20 received signal
21 splitter
22 squaring element
23 capacitor
24 RF power detector
25 low-pass filter
26 squaring element
27 dither tone generator
28 mixer
29 low-pass filter
30 integrator
31 adder
33 second input
41 transmitter
42,43 Mach-Zehnder modulators (MZMs)
44 laser source
45 splitter
46 optical π/2-phase shifter
47 combiner
48 output signal
51 delay interferometer (DI)
52 delay difference
53 destructive output port
54 constructive output port
55,56 detectors
57 subtractor

The invention claimed is:

1. A phase control circuit for an optical receiver comprising:
a squaring element configured to square a received signal to generate a squared signal;
a power detector configured to generate an error signal based on the squared signal;
a dither generator configured to generate a dither signal;
a mixer configured to mix the dither signal and the error signal to generate a mixed signal;
an integrator configured to integrate the mixed signal to generate an integrated signal; and
an adder configured to add the dither signal received from the dither generator and the integrated signal received from the integrator to generate a phase control signal for use by a delay interferometer.

2. The circuit of claim 1, further comprising:
a low-pass filter configured to filter the mixed signal to generate a filtered signal that is used by the integrator to generate the integrated signal.

3. The circuit of claim 1, wherein the squared signal generated by the squaring element comprises a clock component and a component that depends on a phase of the delay interferometer, and wherein the power detector comprises a low-pass filter configured to remove the clock signal from the squared signal.

4. The circuit of claim 1, wherein the power detector comprises a squaring element and has a bandwidth ranging just above direct current (DC) to an upper frequency which is less than the symbol frequency of an optical data transmission system for which the phase control circuit is designed.

5. The circuit of claim 1, wherein an input of the power detector is connected to an output of the squaring element by a capacitor.

6. A method for phase control of an optical receiver comprising:
receiving an electrical signal at a squaring element;
generating, based on the received electrical signal, a squared signal;
detecting power of the squared signal by a power detector to obtain an error signal at an output of the power detector;

generating a dither signal;
mixing the dither signal and the error signal to generate a mixed signal;
integrating the mixed signal to generate an integrated signal; and
adding the dither signal and the integrated signal to generate a phase control signal for use by a delay interferometer.

7. The method of claim 6, further comprising:
low-pass filtering the mixed signal to generate a filtered signal that is used to generate the integrated signal.

8. The method of claim 7, wherein the squared signal generated by the squaring element comprises a clock component and a component that depends on a phase of the delay interferometer, and wherein the method further comprises:
low-pass filtering the squared signal at the power detector to remove the clock signal from the squared signal.

9. The method of claim 6, further comprising:
filtering the squared signal by a capacitor before the squared signal is provided to the power detector.

10. An apparatus comprising:
a splitter configured to split a received optical signal into first and second equal parts;
an in-phase balanced receiver configured to receive the first signal part and comprising:
a first delay interferometer configured to generate a constructive output and a destructive output,
a first phase control circuit configured to generate a delay in the first delay interferometer such that the constructive output of the first delay interferometer becomes a maximum if there is no phase shift between two successive symbols of the received optical signal, wherein the first phase control circuit comprises:
first and second serial photodiodes configured to generate a first electrical signal based on the constructive and destructive outputs of the first delay interferometer;
a squaring element configured to square the first received signal to generate a squared signal;
a power detector configured to generate an error signal based on the squared signal;
a dither generator configured to generate a dither signal;
a mixer configured to mix the dither signal and the error signal to generate a mixed signal;
an integrator configured to integrate the mixed signal to generate an integrated signal; and
an adder configured to add the dither signal received from the dither generator and the integrated signal received from the integrator to generate a first phase control signal for forwarding to the first delay interferometer;
an quadrature balanced receiver configured to receive the second signal part and comprising:
a second delay interferometer configured to generate a constructive output and a destructive output,
a second phase control circuit configured to generate a delay in the second delay interferometer such that the constructive output of the second delay interferometer becomes a maximum if there is a phase shift of a predetermined amount between two successive symbols of the optical signal.

11. The apparatus of claim 10, wherein the second phase control circuit comprises:
first and second serial photodiodes configured to generate a second electrical signal based on the constructive and destructive outputs of the second delay interferometer;
a squaring element configured to square the second received signal to generate a squared signal;
a power detector configured to generate an error signal based on the squared signal;
a dither generator configured to generate a dither signal;
a mixer configured to mix the dither signal and the error signal to generate a mixed signal;
an integrator configured to integrate the mixed signal to generate an integrated signal; and
an adder configured to add the dither signal received from the dither generator and the integrated signal received from the integrator to generate a second phase control signal for forwarding to the second delay interferometer.

12. The apparatus of claim 10, wherein the second phase control circuit is configured to generate a delay in the second delay interferometer such that the constructive output of the second delay interferometer becomes a maximum if there is a phase shift of $\pi/2$ between two successive symbols of the optical signal.

* * * * *